(12) United States Patent
Tarelin et al.

(10) Patent No.: US 6,698,205 B2
(45) Date of Patent: Mar. 2, 2004

(54) DEVICE TO INCREASE TURBINE EFFICIENCY BY REMOVING ELECTRIC CHARGE FROM STEAM

(76) Inventors: Anatoly Oleksiovych Tarelin, Uborevych St., 50-b, Apt. 114, Kharkiv (UA), 61129; Volodymyr Petrovych Skliarov, Korolenko St. 4 Pivdenny-2, Kharkiv Olbast (UA), 62461; Oleh Weres, c/o Sonoma Research Company 101 S. Coombs St., Suite L, Napa, CA (US) 94559

( * ) Notice: Subject to any disclaimer, the term of this patent is extended or adjusted under 35 U.S.C. 154(b) by 0 days.

(21) Appl. No.: 10/147,932

(22) Filed: May 16, 2002

(65) Prior Publication Data

US 2002/0174655 A1 Nov. 28, 2002

(51) Int. Cl.[7] ............................................. F01K 17/00
(52) U.S. Cl. ............................... 60/686; 60/687; 415/1
(58) Field of Search ...................... 60/685, 686, 687; 415/1

(56) References Cited

U.S. PATENT DOCUMENTS 5,735,125 A * 4/1998 Tarelin et al. ................ 60/685
5,992,152 A * 11/1999 Weres et al. ................. 60/685

* cited by examiner

Primary Examiner—Hoang Nguyen

(57) ABSTRACT

Small, rigid electrodes in the form of sharp-pointed rods ("pins") installed around the periphery of the diffuser at the exhaust of a steam turbine extend into the path of the wet steam flowing out of the turbine and remove electric charge from the steam, whereby turbine back-pressure and turbulence within the exhaust hood are decreased, and the energy conversion efficiency of the power generating unit is increased. In the preferred embodiment these pins are grounded, but pin electrodes isolated from electrical ground with a suitable voltage applied may give better performance in some situations. Similar pins may be installed around the bearing cone facing the turbine exhaust, along the L-stage guide blades, or along the trailing edges of flow guides or baffle plates within the exhaust hood and condenser to remove from the steam charge that may be present in the steam in those places, whereby energy conversion efficiency is likewise increased.

23 Claims, 5 Drawing Sheets

DEVICE TO INCREASE TURBINE EFFICIENCY BY REMOVING ELECTRIC CHARGE FROM STEAM

BACKGROUND OF THE INVENTION

1. Field of the Invention

This invention relates to steam turbines, and more particularly to methods and devices for increasing the power generated by controlling electric charge present in the steam exiting the turbine.

2. Description of the Related Art

In U.S. Pat. No. 5,735,125 Tarelin, et al. reported the presence of positive electric charge in steam exiting the turbine in an electric power generating unit, and disclosed a method to increase the energy conversion efficiency of the generating unit, employing active electrodes in the form of cables stretched above the condenser tube bundle in alternation with grounded but otherwise similar counterelectrodes. When a large positive voltage of appropriate magnitude was applied to the active electrodes, turbulence in the steam flow decreased, and the power generated increased by about one percent.

In U.S. Pat. No. 5,992,152 Weres et al. explained that the charge observed in the steam is the result of electrokinetic phenomena. An electrochemical equilibrium exists between the metal surfaces exposed to steam flow and the thin film of moisture present on the surface, whereby the film of moisture may contain static electric charge of either sign, depending on the acid-base properties of the surface, and the pH and conductivity of the water film. The large gas dynamic shear at the surface of the turbine blades tears the liquid film from the metal surface, and transfers the moisture together with the static charge that it contains to the flowing wet steam. Charge separation may also occur where the film of moisture is torn from the surface of the metal at the trailing edge of a flow guide or baffle plate which is exposed to high velocity steam flow near to the turbine exhaust.

The return of the electric charge from the steam to ground involves electrical discharge activity which drives turbulence in the steam flow and thereby decreases the amount of power generated. U.S. Pat. No. 5,992,152 describes how the amount of electric charge in the steam may be controlled by varying the amount of ammonia added to the feed water, whereby the amount of power generated is increased. The amount of electric charge released to the steam may also be controlled by modifying the composition of the metal surface; for example, applying a stainless steel cladding to the trailing edge of a carbon steel baffle or flow guide exposed to high velocity steam flow will decrease the amount of negative charge released to the steam. This method has several drawbacks: (1) the stainless steel cladding may cause positive charge to be released to the steam (instead of the desired condition of no charge); (2) application of the cladding creates a junction of two disimilar metals, possibly causing localized corrosion; (3) the cladding may protrude from the edge of the plate and interfere with the steam flow.

Depending on the operating regime of the turbine, the charge volumetric density in the turbine exhaust reaches the value of $10^{-7}$ to $10^{-4}$ $C/m^3$ and creates an electric field of up to approximately $2 \cdot 10^5$ V/m. The electric field associated with the volumetric charge significantly affects the character of the steam flow and increases the pressure after the turbine's last stage. The electric charge in the turbine steam flow increases the moisture content of the steam by nucleating water droplets, whereby electrical erosion processes are intensified. FIG. 1 shows the location of the plume 1 of maximum electric charge density coming out of the turbine. The plume is approximately cylindrically symmetrical and coaxial with the axis of the turbine, and is located near to the periphery of the last stage (hereinafter "L-stage") of the turbine.

The plume of positive charge coming out of the turbine creates an electric field which pulls the electrically charged steam back toward the turbine, whereby backpressure is increased and the amount of power generated is decreased. In PCT Application PCT/UA99/00019 and U.S. patent application Ser. No. 09/979,255 Tarelin and Skliarov provided a method and device for removing a large fraction of the electric charge from the steam exiting the turbine, whereby the power generated is increased. Stainless steel cables are installed a short distance downstream of the last stage of the turbine and parallel to it. The cables are fastened to the walls of the exhaust hood using high voltage insulators which isolate them from ground and springs which maintain them under tension. The cables are connected to one pole of a DC power supply, and the other pole of the power supply is connected to electrical ground. A voltage of polarity opposite to the sign of electric charge present in the steam is applied to the cables, whereby electrical discharges are generated around the cables, and a substantial fraction of the electric charge is removed from the steam, whereby the power generated is increased. Two arrangements of the electrical cables were provided. In the preferred embodiment, several linear strands of the cable are stretched in a parallel arrangement in a plane parallel to the last stage of the turbine and located a short distance downstream of the last stage. Another installation was suggested, wherein a hexagonal "spider web" of cables was stretched and suspended in the same location, in a plane parallel to the L-stage turbine blades.

The method and apparatus described by Tarelin and Skliarov removes a substantial fraction of the charge from the steam whereby the power generated is increased, but has several significant drawbacks: (1) the cables are located in the zones of maximum steam flow velocity, and inevitably interfere with the steam flow, thereby increasing the backpressure and decreasing the power generated; (2) the cables are exposed to intense erosion by the high velocity wet steam flowing past them, and may also be subject to corrosive electrochemical phenomena which will eventually cause them to break; (3) the high velocity steam flow may cause the cables to vibrate, hastening their failure; (4) the high voltage insultors and springs that the cables are attached to are fairly long, and some portion of the insulator bodies may intrude into the zone of high velocity steam flow; (5) the high voltage insulators interfere with the steam flow, and are eroded by it; (6) it may be difficult to actually install this maze of cables, springs and insulators in the location desired relative to the last stage of the turbine; (7) if a cable breaks, it may go flopping around, potentially damaging the last stage of the turbine, and very likely forcing a unit outage to repair the damage; (8) a single cable break may lead to progressive failure of the other cables; (9) a single cable break may render the entire system inoperative by shorting the entire array of cables to ground. For these reasons, the apparatus described by Tarelin and Skliarov in PCT Application PCT/UA99/00019 is impractical, and is unlikely to find industrial application.

SUMMARY OF THE INVENTION

The object of this invention is to improve upon the inventions provided in the patents and patent applications cited above in a manner which makes them more suitable for practical application.

The invention disclosed herein is an improved design and arrangement of electrodes to remove electric charge from the steam exiting a steam turbine, whereby the power generated is increased, and the problems with the apparatus that was described in PCT Application PCT/UA99/00019 are eliminated. Instead of cable electrodes stretched across the turbine exhaust, electrodes in the form of thin, sharp-pointed rods (hereinafter called "pins") are installed around the periphery of the diffuser, or about the periphery of the bearing cone to remove electric charge from the steam exiting the turbine (FIGS. 1, 2 and 3). Similar pins may be mounted on the last stage guide blades to decrease the amount of electric charge released from the guide blades (FIG. 3). Similar pins may also be mounted along the trailing edges of flow guides or baffles that are exposed to high velocity steam flow (FIGS. 4 and 5), whereby the release of electric charge from these edges is decreased, the power generated is increased, and corrosion within the condenser is decreased. The discovery that properly located small, robust electrodes which interfere very little with steam flow can usefully increase the energy conversion efficiency of the generating unit at very low cost was surprising and unexpected. The ability to achieve nearly the same effect using small grounded "pin" electrodes was all the more surprising.

Installing pin electrodes around the periphery of the diffuser as illustrated in FIGS. 1, 2 and 3 allows most of the charge to be removed from the steam exiting the turbine while avoiding the problems with the system of cable electrodes that were described by Tarelin and Skliarov in PCT Application PCT/UA99/00019 and U.S. patent application Ser. No. 09/979,255. Specifically: (1) only the pins actually extend into the direct path of steam flow, whereby flow resistance is minimized; (2) the pins are solid rods of stainless steel, which will endure prolonged exposure to the high velocity steam flow with minimal damage; (3) the pins are rigid and relatively short, whereby damaging vibrations will not occur; (4) the collector, insulators, and high voltage cable shown in FIG. 2 are all easily installed behind the lip of the diffuser, and out of the way of the high velocity steam flow; (5) therefore, the collector, insulators, and high voltage cable cannot be damaged by the high velocity steam flow. Similar benefits may be obtained by installing pin electrodes around the bearing cone.

Installing pin electrodes along the trailing edges of flow guides and baffles exposed to high velocity flowing steam as illustrated in FIGS. 4 and 5 is an improvement upon cladding the trailing edges with stainless steel (as described in U.S. Pat. No. 5,992,152) for several reasons: (1) the pins are very small compared to the edge of the plates they are mounted on, and will themselves release very little charge to the steam flowing over them; (2) the length of the junction of two disimilar metals created by installing the pins is small and the junction can be shielded from exposure to the flowing steam by proper design, whereby the probability of local corrosion is minimized; (3) the pins are small and will interfere very little with steam flow, especially if installed along the trailing edges at an angle parallel to the steam flow.

DESCRIPTION OF THE DRAWINGS

Four different installations of the electrodes are described. The installations depicted in FIGS. 1, 2 and 3 remove electric charge from steam coming directly out of the turbine. The charge at this location is usually positive.

Figure 1:
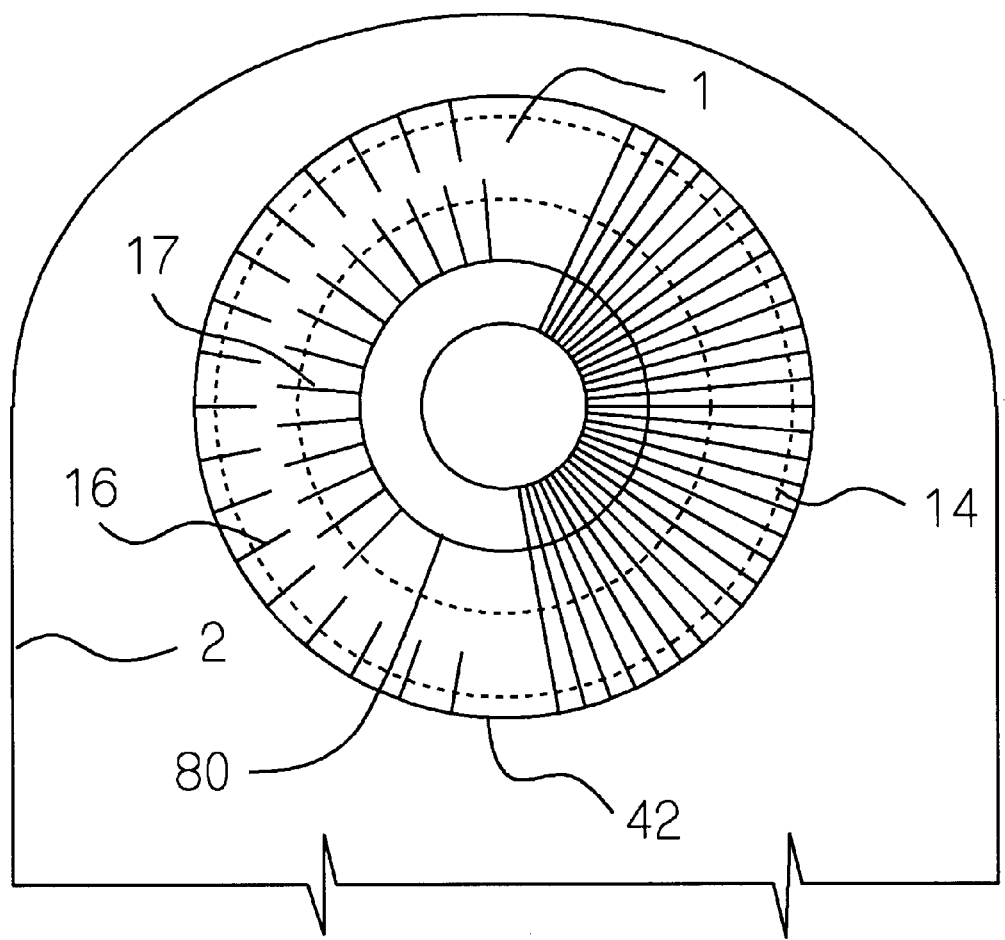
FIG. 1 shows inward pointing pin electrodes 16 installed around the periphery or lip of the diffuser 42, and outward pointing electrodes 17 installed in a circle around the bearing cone 80 (that is, the steel plate of roughly conical form which shields the outer bearing of the turbine shaft from the steam flowing out of the turbine; sometimes called the "inner flow guide"). Both sets of electrodes serve to remove charge from the steam coming out of the turbine; either one or both sets of pin electrodes may be installed in a generating unit. Only part of the turbine blades 14 are shown for clarity, and 2 is the wall of the exhaust hood. Pin electrodes 16 are evenly spaced around the entire circumference of diffuser lip 42, but only part of them are shown for clarity; the same comments apply to pin electrodes 17 mounted on the bearing cone. The length of the pin electrodes 16 and pin electrodes 17 is chosen to extend into the circular zone or plume of maximum charge density 1, the boundaries of which are indicated by dashed lines. Pin electrodes 16 and pin electrodes 17 can be either grounded as illustrated in FIG. 3, or energized with an applied voltage, as illustrated in FIG. 2.

Insulators 26 are made of a material chosen to withstand the voltage applied to the electrodes (up to about 10 kV) when operating in a wet steam flow. Silicone rubber is a good choice, and has excellent resistance to erosion by impinging water drops as well. If the collector and insulators are installed far enough into the shadow of the diffuser lip to avoid steam flow 18 and impinging water droplets entirely, insulators 26 can be made of polytetrafluoroethylene, polypropylene or another suitable insulating plastic instead of silicone rubber.

High-voltage cable 30 connects collector 20 and pins 16A to high-voltage power supply 28. Charge probe 34 is introduced into the steam flow 18 and connected to control module 36, which regulates the output of HV power supply 28. Thus, a voltage relative to electrical ground may be applied to pins 16A, said voltage being automatically adjusted to maintain the desired charge density in the steam flowing past pins 16A into the exhaust hood.

Figure 2:
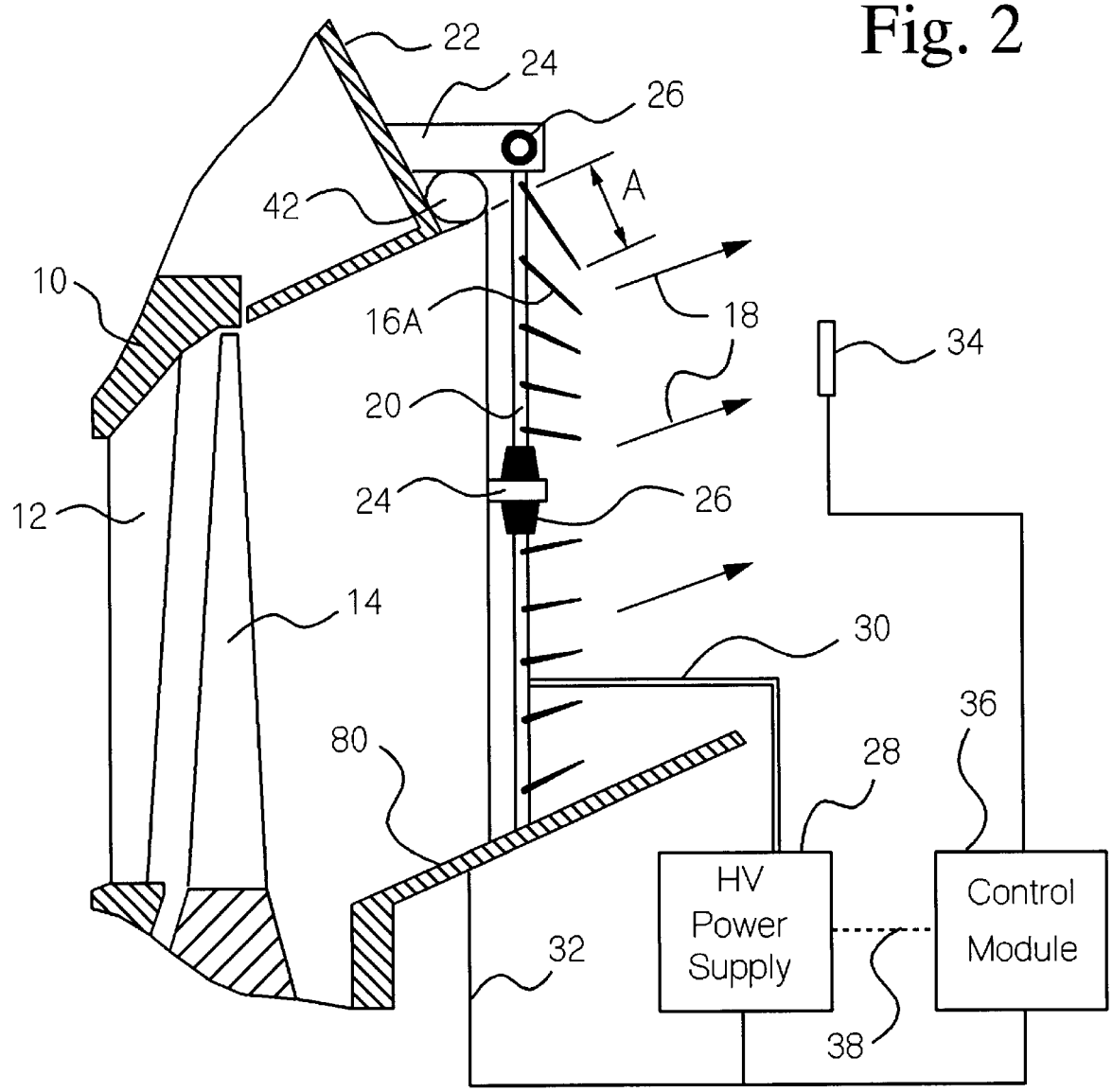
FIG. 2 shows the upper part of a single turbine exhaust in cross section, including turbine casing 10, diffuser 22, diffuser lip 42, one L-stage guide blade 12, and one L-stage turbine blade 14. Energized pin electrodes 16A are mounted on collector 20, and extend distance A into the path of steam flow 18 out of the turbine. Collector 20 comprises several arcuate sections of metallic rod or pipe and is attached to the diffuser 22 through mounting brackets 24, but is electrically isolated from them by insulators 26. Collector 20 and its supporting members are located outside the direct path of steam flow 18, whereby the associated flow resistance is due to pins 16A alone and is thereby small, and electrical isolation of pins 16A from ground is easily preserved.
Figure 3:
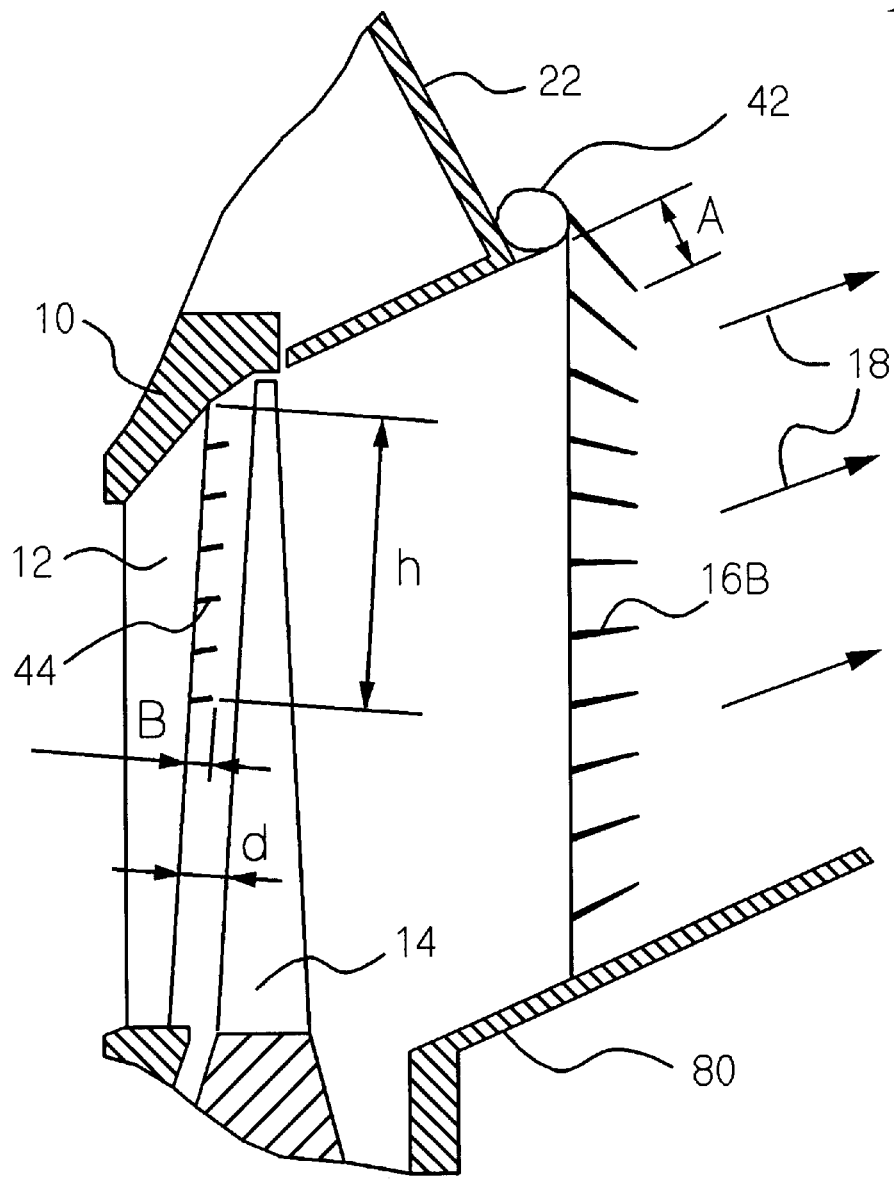

FIG. 3 shows grounded pin electrodes 16B mounted directly on to diffuser lip 42 and in electrical contact with it. This arrangement is simple, inexpensive and robust, with no external equipment or maintenance required. As in FIG. 2, the length of grounded pins 16B is determined to expose a length A of grounded pins 16B to high velocity steam flow 18, sufficient to extend well into the zone of maximum charge density (1 in FIG. 1).

FIG. 3 also shows grounded pin electrodes 44 mounted on the trailing edges of the last stage guide blades 12 and in electrical contact with them. Only interval h of the guide blades which corresponds to the zone of maximum charge density (1 in FIG. 1) need be provided with pins 44 to effect this purpose.

Figure 4:
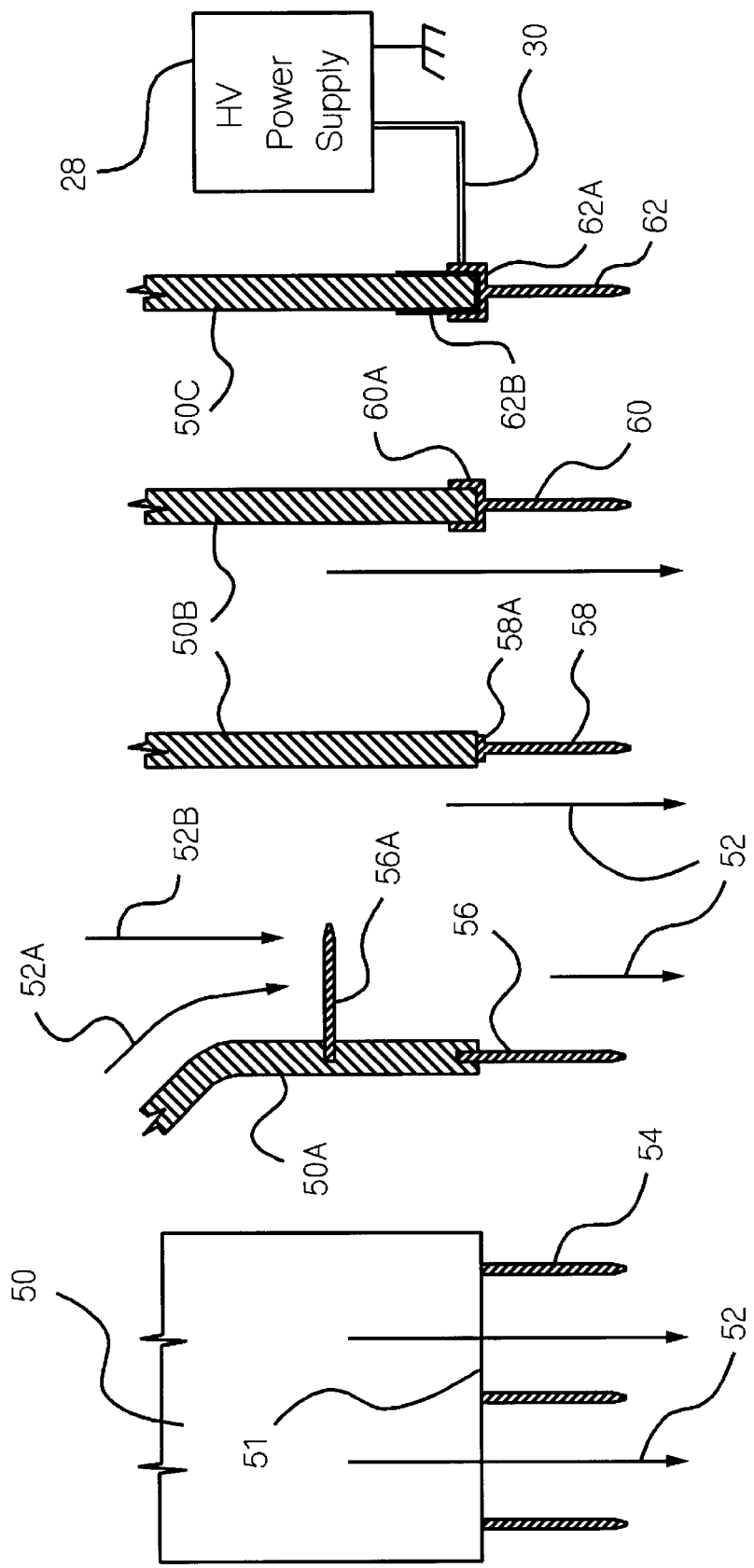
Figure 5:
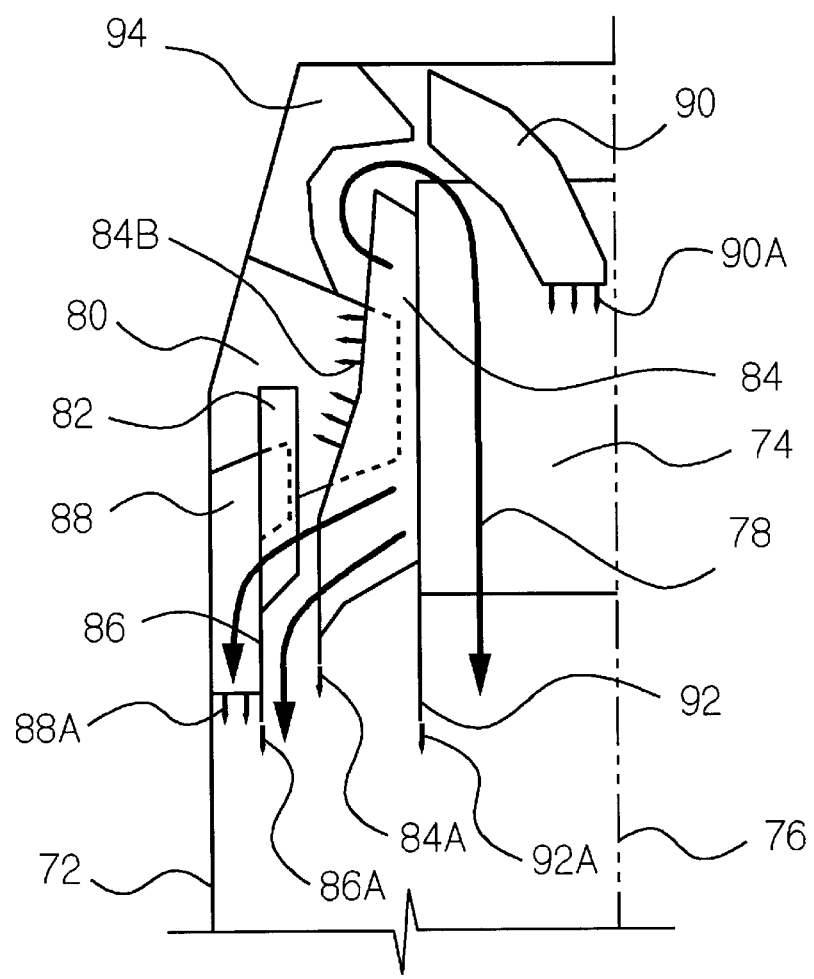

The installation illustrated in FIGS. 4 and 5 serves to remove from steam the electric charge which may be released from the surfaces or trailing edges of flow guides or baffles or other metallic members exposed to wet steam flowing by them at high velocity. In the case of flow guides or baffles or other members made of carbon steel, the sign of the charge released will usually be negative. However, positive charge may be released from the surfaces or trailing edges of stainless steel members; for example, stainless steel shrouds that protect thermally insulated pipes from direct contact with the steam flow.

FIG. 4 illustrates installation of pin electrodes 54 along trailing edge 51 of baffle plate or flow guide 50, where 52 indicates the direction of steam flow. The tips of pins 54 should be blunted, to reduce the hazard of injury to personnel who might need to enter the condenser cavity from time-to-time. Pins 56 may be press-fitted into holes drilled along the trailing edge of baffle plate or flow guide 50A to minimize release of charge from the trailing edge of plate 50A when exposed to steam flow past it 52. Pins 56A may be installed away from the edge and at a large angle to plate 50A, to recapture charge released to steam 52A flowing past a convex region on the surface of the plate, or to remove charge from steam 52B flowing down a steam flow path adjacent to plate 50A. Pins 58 may be attached to a continuous strip of metal 58A which is fastened to the trailing edge of baffle plate 50B by spot-welding, screws, or other appropriate means. This method of installation is quicker and easier, as a sufficiently rigid mounting strip 58A would need to be fastened to the edge of the plate in a few places only. Pins 60 can also be attached to a metal channel 60A that fits over the edge of the plate and is fastened to it by welding, bolting, or another appropriate means.

Finally, pin electrodes 62 may be fastened to flow guide or baffle plate 50C but electrically isolated from ground by further providing insulator 62B. In this case, a suitable voltage (which will usually be positive in this situation) can be applied to pin electrodes 62 using high voltage power supply 28 and high voltage cable 30, whereby a greater fraction of electric charge can be removed from the steam, increasing the beneficial effect.

FIG. 5 indicates places within the exhaust hood and condenser of a typical large power generating unit where the pin electrodes might profitably be installed. The exhaust hood of a modern 800 MW coal-fired generating unit in the United States is depicted. This unit has two dual-flow low pressure turbines (hereinafter "LP turbines") and a split condenser. FIG. 5 depicts one-half of one LP turbine 74 along with the corresponding section of the exhaust hood. The exhaust hood section is approximately symmetrical about its center line 76. Wet steam is discharged from LP turbine 74, toward end wall 72. Bearing cone 80 (also called the "inner flow guide"), middle flow guide 82, diffuser 84, and baffle plates 90 and 88 (there are two of each at either exhaust of the LP turbine) redirect steam flow 78 down towards the tube bundle (not shown). Diffuser 84 resembles the mouth of a horn connected to LP turbine 74. Bearing cone 80 is a truncated cone. Middle flow guide 82 is a half-circular strip cut from a conical surface which is attached to vertical wall 86. Flow baffles 88 are curved; the upper part of each baffle plate lies in a radial plane while the lower part lies in a vertical plane. Flow baffles 88 are attached to end wall 72 and support middle flow guide 82 and vertical wall 86. Another vertical wall 92 extends down from the end of LP turbine 74. Structural brace 94 is cast as part of the upper turbine housing and lies in a vertical plane that contains the axis of LP turbine 74.

Charge will be released to the steam from the trailing edge of any baffle plate or flow guide exposed to high velocity flow of wet steam 78. To return this electric charge to electrical ground, pin electrodes should be installed along these various trailing edges. In this particular generating unit, pin electrodes 84A can profitably be installed along the lower lip 84A and elsewhere along the periphery 84B of diffuser 84; along the lower edge 86A of vertical wall 86; along the lower edge 88A of baffle plate 88; along the trailing edge 90A of baffle plate 90; and along the lower edge 92A of vertical wall 92.

Pin electrodes 84A and 84B in FIG. 5 are distinct from pin electrodes 16A and 16B in FIGS. 2 and 3 in respect to their location, orientation, and function. Pins 84A and 84B are installed along the edge of the diffuser, which is some distance removed from the turbine exhaust orifice in the kind of generating unit that is depicted in FIG. 5, and they lie approximately in the plane of the metal plate that comprises the edge of diffuser 84. These pins are designed to remove from the steam electric charge (ordinarily negative) that is released from the outer, trailing edges of diffuser 84. In FIGS. 2 and 3, pins 16A and 16B are installed near to the L-stage of the turbine, and are oriented at a large angle relative to the diffuser wall, exposing them to the steam flowing directly from the turbine. These pins are designed to remove the electric charge which steam 18 acquired flowing out of the L-stage of the turbine, which is usually positive. In some cases, the two sets of pin electrodes (84A or 84B, and 16A or 16B) may profitably be combined in a single installation; for example, in a generating unit where a plume of positive charge is detected coming out of the L-stage of the turbine, and plumes of negative charge are present downstream of the edges of the diffuser.

OPERATION OF THE INVENTION

Charge separation may occur at the trailing edge of any metallic body exposed to high velocity flow of wet steam. At the trailing edge, water droplets are torn from the surface of the metal, and may carry static charge away from the metal, the sign and amount of the charge depending on flow velocity, moisture content, pH of the liquid film and its conductivity. Because the largest steam flow velocities are present in the last stage of the turbine and the steam contains moisture, a substantial amount of positive charge is usually present in the steam coming directly out of the turbine. Thus, the last stage of the turbine acts as an aerosol electrostatic generator. This charge is released from the turbine blades, which are usually made of a high-chrome or stainless steel, and are commonly coated with a thin solid deposit rich in silica (which is commonly present in the make-up water). The composition of the metal and the composition of the surface deposits both favor the release of positive charge, which is commonly observed coming out of the turbine. (The effect of condensate pH and the composition of the metal surface upon the sign and amount of charge released to the steam was explained by Weres et al. in U.S. Pat. No. 5,992,152 which is herein incorporated by reference.)

The electric charge is carried by water droplets in the steam; therefore, there is a strong correlation between electric charge density and moisture in the steam. The flow velocities coming out of the turbine are highest near the ends of the L-stage blades (that is, the peripheral part of the L-stage wheel), and the amount of moisture in the steam is greatest there as well. Accordingly, the zone of maximum charge density 1 (FIG. 1) coming out of the turbine is an annulus coincident with the peripheral part of turbine blades 14.

The basic operation of the invention is explained in reference to FIG. 3 for the common case of positive charge coming out of the turbine. Due to positive electric charge carried by the moisture in steam 18 flowing out of the turbine, the electric potential in flowing steam 18 rapidly increases with distance from the last stage turbine blade 14. There is a large difference of electric potential between flowing steam 18 and grounded pins 16B which are exposed to flowing steam 18 at some distance from L-stage turbine blades 14. The resulting electric field is concentrated at the surface of pins 16B due to their small radius, and the field is especially strong at the pointed tips of the pins. The breakdown electric field strength of the wet steam is exceeded by a substantial margin about the pins, and electrical discharges are produced, which conduct electric charge from the steam to electrical ground. Because the tips of pins 16B (in Figure) or 16 (in FIG. 1) are located within the annular zone of maximum charge 1, a large fraction of the electric charge is removed from the steam. Pin electrodes 17 (in FIG. 1) mounted in a circle about bearing cone 80 function in the same way.

Removing electric charge from steam 18 exiting the turbine decreases or eliminates the electrostatic force that acts to pull charged steam back towards the turbine, and eliminates discharges from the steam to flow baffles, etc., which generate turbulence. These phenomena increase backpressure and gas dynamic losses in the exhaust hood, whereby eliminating them by removing charge from the steam improves the energy conversion efficiency of the generating unit, whereby more power is generated without increasing the amount of fuel consumed.

While in FIG. 3 pins 16B are electrically grounded, in FIG. 2 energized pin electrodes 16A are isolated from electrical ground and provided with electronics that allow the potential of pins 16A to be maintained at a value that results in optimal removal of charge from the steam. Applying a negative potential to energized pin electrodes 16A will intensify the electric fields at their tips, producing more intense discharge activity, whereby a greater amount of positive charge is removed from the steam than would be the case with grounded pins 16B in FIG. 3. The charge in moisture impinging on probe 34 goes to ground through current measuring circuitry in control module 36 whereby a quantitative indication of the amount of charge present in steam flow 18 is provided.

Operation of the active charge control system depicted in FIG. 2 requires the precursor step of determining the range of values of charge density in steam flow 18 (as measured using probe 34 and control module 36; see U.S. Pat. No. 5,992,152) which is most advantageous to the purpose of maximizing the energy conversion efficiency of the generating unit. This predetermined, optimal value of charge density may be a function of the operating state of the generating unit; that is, load, incoming steam P and T, etc.. The ability to automatically adjust the operation of the charge removal system is especially desirable in a situation where operating conditions are varied frequently and/or widely.

In routine operation, control module 36 is programmed to compare the charge density sensed by charge probe 34 with the predetermined value of charge density advantageous to operation of the invention, which may depend on the operating state of the unit. Control module 36 produces control signal 38 which causes high voltage power supply 28 to adjust the voltage applied to pins 16A so as to provide charge density sensed by charge probe 34 within the predetermined range of values, whereby the energy conversion efficiency of the generating unit is maximized.

An appropriate place to install pin electrodes inside the turbine is illustrated in FIG. 3. Usually, moisture first appears in the steam flow upstream of L-stage guide blades 12, whereby electric charge may be present in the gap between guide blade 12 and L-stage turbine blade 14. Grounded pins 44 of length B mounted on L-stage guide blades 12 remove the electric charge from steam in this region and conduct it to ground.

Charge separation also occurs at the surfaces and especially at the trailing edges of flow guides and baffle plates which are located near to the turbine and exposed to high velocity flow of wet steam. A relatively thin layer of negative charge may also be present along the inner surface of the diffuser, concentric with and surrounding the plume of positive charge coming out of the turbine. Typically, the diffuser wall, flow guides and baffle plates are made of carbon steel, favoring the release of negative charge (see U.S. Pat. No. 5,992,152).

The charge separation process itself acts as an electrostatic brake upon steam flow, and subsequent discharge of electric charge from the steam to grounded metallic members within the condenser will cause turbulence in the steam flowing towards the condenser tube bundle, whereby the energy conversion efficiency of the unit will be decreased. When negative charge returns to ground through discharges to other metallic members inside the condenser, these metallic members will be anodically polarized, and may corrode if made of carbon steel as they usually are. Copper alloy condenser tubes may be corroded in a similar manner.

In order to eliminate this source of turbulence and corrosion, it is desirable to prevent the release of electric charge, and especially negative charge, from the trailing edges of flow guides, baffle plates, etc.. Installations for this purpose are illustrated in FIG. 4. Pins 54 are installed along trailing edges 51 of flow guides and baffle plates to recapture and return to ground electric charge released from trailing edges 51. The negative electric potential in the charged steam increases rapidly with distance from trailing edge 51, whereby intense electric fields are produced about the tips of pins 54, resulting in electrical discharges which transfer electric charge from flowing steam 52 to the grounded pins 54. The presence of grounded pins 54 shapes the flow of charged steam near to them in a beneficial manner. Grounded pins 54 exert an electrostatic force upon charged steam flow 52 which attracts the charged steam towards them. Therefore, the charged steam stays close to the plane of pins 54, and flows towards the pins within that plane, favoring rapid discharge.

DESCRIPTION OF THE PREFERRED EMBODIMENT

The choice of material to make the pins of will depend on the sign of the charge of the steam. The return of positive charge to ground through the pins will polarize them cathodically. Materials that withstand cathodic polarization with little or no damage will serve in this situation; for example, carbon steel, stainless steel, or copper alloys. However, materials that are damaged by cathodic polarization cannot be used; for example, titanium alloys.

The return of negative charge to ground through the pins will polarize them anodically. Materials that withstand anodic polarization without corroding will serve in this situation; for example, titanium, stainless steel or other alloys related to stainless steel which rely on chromium content to protect them from corrosion. However, materials that are corroded when anodically polarized cannot be used; for example, carbon steel or brass.

As a practical matter, stainless steel is the preferred material for the pins, as it tolerates both anodic and cathodic polarization, is readily available, and is not very expensive.

The preferred embodiment of the invention is illustrated in FIG. 3, comprising pins 16B mounted directly on diffuser lip 42. Pins 16B are directly mounted on diffuser lip 42, and there are no insulators, nor electrical feeds through the condenser wall. Operation of the installation is entirely passive, the installation is robust, and the only maintenance required is to examine the pins for corrosion and replace them if necessary when the unit is down and the condenser opened for some other reason. This embodiment is especially well-suited for application where the operating state of the generating unit is fixed and stable most of the time. This embodiment does not require a probe for measuring charge density, nor any electronics or power supply.

The diameter of pins 16B is preferably 5 mm or $3/16$ inch, and their length is preferably chosen to make length A which is exposed to steam flow 18 about 200 mm. The spacing of pins 16B about the periphery of diffuser lip 42 should preferably be about 100 mm, and certainly not greater than 300 mm. These dimensions represent an advantageous compromise between several considerations: (a) more and (b) longer pins remove more charge from the steam, but (c) the pins must be stiff enough to endure exposure to the steam flow, and (d) flow resistance should be minimized. At the charge density that exists at the location of pin electrodes 16B (typically $10^{-7}$ to $10^{-4}$ C/m$^3$), the charge gathering effect of each pin electrode extends 200 to 400 mm. The distance between the electrodes mounted along the periphery of the diffuser should be such that the zones of action of adjacent electrodes overlap. The 100 mm preferred spacing provides uniform removal of electric charge from the entire circumference of charge plume 1 (in FIG. 1). The 300 mm maximum spacing provides adequate though not optimal uniformity of charge removal, while minimizing resistance to the steam flow and decreasing installation cost.

The alternative embodiment illustrated in FIG. 2 is advantageous if the operating regime of the generating unit is highly variable, whereby it may be necessary to adjust operation of the charge removal system in response to variations in unit load, etc.. If positive charge is present in the steam exiting the turbine (the usual case), applying negative voltage to collector 20 and energized pin electrodes 16A will allow more complete removal of positive charge from the steam than grounded pin electrodes (FIG. 3) would remove. A regulated high voltage power supply capable of 10 kV output will suffice to remove most of the charge from the steam. The current output of the power supply must be large enough to handle the amount of charge that is to be removed from the steam by the energized pin electrodes that will be powered by the supply. To provide an adequate margin of safety against parasitic electrical discharges, pins 16A and collector 20 should come no closer than 80 mm, and preferably no closer than 120 mm to any grounded metallic body within the condenser. The high voltage insulators employed should have insulating surface length not less than 80–100 mm, which will provide adequate assurance agains electrical breakdown at 10 kV in the wet steam environment. High voltage cable with a voltage rating at least as high as the maximum voltage of the power supply must be used. If the cable is exposed to flowing wet steam, silicone rubber insulation is preferred. Polytetrafluoroethylene is another good choice of insulating material, but only if the cable will not be exposed to high velocity steam flow. The dimensions and spacing of pin electrodes 16A are preferably as specified above for grounded pin electrodes 16B in FIG. 3.

If charge is present in the steam in the region between L-stage guide blades 12 and L-stage turbine blades 14, pins 44 may advantageously be mounted on guide blades 12 in order to remove electric charge from the steam in that region. The maximum electric potential will be present midway between guide blades 12 and L-stage turbine blades 14. Therefore, the length of electrically grounded pins 44 is preferably B=d/2 (that is, one-half the distance that separates guide blades 12 and L-stage turbine blades 14), whereby the pointed tips of pins 44 are located in the region of maximum electric potential. At this location, intense electric fields are produced at the tips of pins 44, electrical discharges are produced, and electric charge is transferred from the steam to electrical ground. Pins 44 need be mounted only along length h on the outer part of guide blades 12 to intercept and take to ground most of the electric charge released from guide blades 12. The diameter of pins 44 is preferably 3 mm or 0.125 inches to facilitate installation and minimize flow resistance; such small diameter is permissible, because pins 44 are short. In order to minimize flow resistance, the pins should be oriented along the direction of steam flow. Ideally, interval h should coincide with location of significant charge density as determined using a movable charge probe between L-stage guide blades 12 and L-stage turbine blade 14. (The procedure and equipment used to conduct a charge survey are described in U.S. Pat. No. 5,992,152.) In the absence of relevant data, h can be taken as equal to 0.4 times the length of guide blades 12.

While they are illustrated together in FIG. 3, pins 16B mounted on diffuser lip 42 and pins 44 mounted on guide blades 12 are distinct and separate installations. In particular, pins 16B may be mounted on diffuser lip 42 without installing pins 44 on guide blade 12, if the latter are objectionable for some reason, or if a charge survey indicates that little or no charge is present in the steam between guide blades 12 and turbine blades 14. Pins 44 can also be combined with the installation depicted in FIG. 2.

Likewise, pin electrodes 17 mounted on bearing cone 80 can be combined with energized pin electrodes 16A or grounded pin electrodes 16B mounted around the periphery of the diffuser. The combination of electrodes 17 mounted on the bearing cone with energized electrodes 16A mounted about the periphery of the diffuser is particularly advantageous if a substantial layer of negative charge is present along the inner surface of the diffuser cone. In this situation, a positive voltage would be applied to energized electrodes 16A to remove the outer layer of negative charge, while electrodes 17 are grounded, and remove the inner plume of positive charge coming out of the turbine. In this situation, electrodes 17 should preferably be about 200 mm long with a spacing of about 100 mm around the bearing cone, while length A of energized electrodes 16A exposed steam flow 18 should equal the thickness of the negative charge layer at that location.

Pins 54 should be installed along trailing edges of flow guides or baffle plates where significant release of charge is known to take place, or may be expected to take place based on experience or analysis. The length of pins 54 should be not less than the spacing between them. Where there is adequate space to install them, pins 350 mm long spaced at intervals of 300 mm are recommended. The preferred diameter is 5 mm or $3/16$ inch. Because charge released in these locations will usually be negative, the preferred material is stainless steel. Shorter pins may be installed at closer spacing where space is limited. The tips of the pins should be blunted for the safety of personnel who may come in contact with them during installation or maintenance operations.

EXAMPLE OF OPERATION OF THE INVENTION

The installation depicted in FIG. 2 has been successfully operated. The demonstration was conducted at a 250/300

MW power generating unit in Ukraine with a single dual flow low pressure turbine. Pins 16B were made of 5 mm stainless steel rod and were installed about both turbine exhausts. The pins installed about the turbine exhaust on the generator side extended to a depth of 140 mm into the steam flow, while the pins installed about the other turbine exhaust (on the regulator side) extended to a depth of 160 mm into the steam flow. The pins were mounted on a circular collector made of 15 mm stainless steel rod A total of 90 pins were installed around each turbine exhaust, and equally spaced around its periphery. The distance between the pins was 100 mm.

During the test, the generating unit was operating in partial cogeneration mode, with part of the steam withdrawn between the intermediate pressure and low pressure turbines. The power generated was approximately 245 MW, and the steam exiting the low pressure turbine contained 4–5% moisture. Applying about −8 kV to pins 16A removed about half of the positive charge from the steam. Detailed analysis of numerous operating parameters of the unit indicated that grounding the pins or applying negative potential to them increased the energy conversion efficiency of the unit by 0.2–0.4%. While applying a negative potential to the pins had a larger beneficial effect, grounding them produced a measurable increase in energy conversion efficiency as well. (The baseline condition was maintaining the pins isolated from electrical ground with no potential applied. In this condition, the pins acquired a charge from the steam and "idled" at a steady-state potential, with no net transfer of charge taking place.)

The experiment was subsequently repeated with pin electrodes long enough to provide length A=200 mm exposed to the steam flow. With the pins grounded, over 90% of the electric charge was removed from the steam flow.

A full set of little plastic "caps" were made, and placed on the tips of the pins whenever anyone was working in proximity to the pins, in order to hide the sharp points as a safety precaution.

CONCLUSIONS, RAMIFICATIONS AND SCOPE

While our above description contains many specificities, these should not be construed as limitations on the scope of the invention, but rather as an exemplification of preferred embodiments thereof. Accordingly, the scope of the invention should be determined not by the embodiments illustrated, but by the appended claims and their legal equivalents.

This invention embodies the surprising and unexpected result that properly located small, rigid electrodes which are robust and offer minimal resistance to steam flow can remove a large fraction of the electric charge from the steam flowing out of the turbine and through the exhaust hood of a power generating unit, whereby turbulence in the steam flow is decreased, and the energy conversion efficiency of the generating unit is measurably increased at very little cost.

The essence of the this invention is to remove charge from the steam in the exhaust hood and condenser of a steam power generating unit by conducting it to ground through rigid charge removal members. The charge removal members are rigid in the sense that they retain their form when installed in a location exposed to steam flow, without the need to suspend or stretch them between tie-points, as was necessary with the cable electrodes described in PCT Application PCT/UA99/00019. The sharp-pointed pins described above are simple to install, and will stand-up to high velocity steam flow well, while offering very little resistance to the steam flow. However, other physical forms for the rigid charge removal members may serve, particularly at the trailing edges of flow guides, where flow velocity will be much smaller, and flow resistance a much lesser concern. The rigid charge removal members can be solid pointed pins as described here, they can be pins with roughened surfaces or covered with spines or bristles to facilitate an electrical discharge, they can be rigid tubes, wires, or springs, or they can be rigid bands of wire mesh attached to the flow guides, or some other physical form or combination of forms that is sufficiently rigid and robust to stand up under the steam flow, with geometry and size chosen to effectively remove charge from the steam.

The dimensions and internal structural details of the exhaust hoods and condensers of power generating units vary widely, and markedly different distributions of electric charge have been recorded in charge surveys conducted at different units. Therefore, the user of the invention provided herein should consider the diverse installations of pin electrodes (or, more generally, rigid charge removal members) described herein to be a catalog of parts from which to construct a complete installation tailored to that particular generating unit (or family of generating units of similar design).

While metallic pins are preferred, the rigid charge removal members may also be fabricated of a suitable nonmetallic material; for example, a conductive ceramic or a composite that contains conductive fibers. Because the current carried by each pin will be small (on the order of 10 milliamperes), and the potential driving the current is large (on the order of kilovolts) the large electrical conductivity of solid metal is not required.

Pin electrodes installed about the periphery of the diffuser or around the bearing come should ideally be equally spaced around the entire perimeter of the diffuser, but unequally spaced pin electrodes that do not cover the entirely periphery of the diffuser or bearing cone can also serve, and such an installation might be preferred in the case of a diffuser which is not nearly symmetrical about the axis of the turbine; for example, the power generating unit that is shown in FIG. 5.

FIGS. 2 and 3 depict a diffuser with a well-defined circular lip near to the orifice through which steam flows out of the turbine (the "turbine exhaust orifice" in the claims), which coincides with the annulus defined by the L-stage turbine blades. In some units, for example the one shown in FIG. 5, there is no diffuser "lip" near to the turbine exhaust orifice; rather, the diffuser extends relatively far from the turbine exhaust orifice, and merges with the system of flow guides which redirect steam flow downwards. In some generating units, the diffuser may be continuous with the exhaust hood wall. In such units, grounded pin electrodes 16B (FIG. 3) would be mounted on the inner surface of the diffuser near to and around the turbine exhaust orifice. The important thing is to locate the tips of the electrodes correctly in relation to the plume of electric charge 1 exiting the turbine, as illustrated in FIG. 1. Energized pin electrodes 16A (FIG. 2) that are electrically isolated from ground may also be used in this situation. They would need to be mounted on a collector outside of the diffuser cone, and extend into the path of steam flow inside the diffuser through holes drilled in the diffuser wall. The energized pin electrodes would need some form of feed-through insulator to prevent shorting on the diffuser wall. Because the operating voltage of energized pins 16A is less than 10 kV, a simple feed-through insulator would suffice; for example, a length of silicone rubber tubing slipped over the pin, and covering it along a length of about 8 cm extending from the diffuser wall on either side of the diffuser wall.

The control module and even the charge probe can be omitted from the installation illustrated in FIG. 2, and the output of the power supply can be controlled manually instead, or simply set to a fixed voltage.

In some situations, it may be advantageous to install energized pin electrodes (or rigid charge removal members of some other form) with no power suppy or external electronics at all. One set of pin electrodes isolated from electrical ground is installed in a location where positive charge is present in the steam, another set of pin electrodes isolated from electrical ground is installed in another location where negative charge is present in the steam, and the two sets are interconnected by an insulated cable. Current will flow from one set of electrodes to the other. In effect, one set of electrodes will serve as the power supply for the other. In practice, the operation of such electrically joined sets of electrodes will differ from grounded electrodes when one of the two sets is able to collect more charge from the steam by virtue of greater size or greater charge density at its location. In that case, the set of electrodes better able to collect charge will operate near to the "idling" potential at electrostatic equilibrium with the steam at that location, while the other set will operate at a large voltage relative to the steam at the other location. This entire installation is properly called a bipolar charge collector isolated from electrical ground. In fact, the bipolar charge collector can consist of a single pin, cable, or another electrically conductive element of size and location such that one part of it is exposed to positively charged steam, while another part of it is exposed to negatively charged steam.

While this invention is expected to find its principle application in electric power generating stations, it may also be used in connection with steam turbines used in other applications; for example, marine propulsion systems. Similarly, the invention is applicable to a power generating unit equipped with a contact condenser, or no condenser at all, provided that the steam exiting the turbine contains moisture; that is, the steam exiting the turbine contains dispersed water droplets.

Electric charge may be transferred to wet steam anywhere inside the turbine, in the exhaust hood, or in the condenser where metallic members are exposed to high velocity flow of wet steam. While the term "exhaust hood" is widely used, it is poorly defined, and in the claims we simply refer to the "steam flow zone" to designate the entire volume available for steam to flow from the last stage of the turbine to the condenser tube bundles (or the water spray zones in a contact condenser). While the primary locations of charge release to the steam within the steam flow zone are expected to be the trailing edges of flow guides and baffle plates which are by design located in areas of high velocity steam flow, charge may also be released to the steam from the surfaces or trailing edges of other metallic members internal to the steam flow zone; for example, the inner surface of the diffuser, and bracing struts or pipes that pass through the upper part of the condenser.

Electric charge transfer to the steam occurs mostly in relatively narrow, well-defined steam flow paths characterized by high steam flow velocity between and beside the various metallic members that guide or obstruct the flowing steam. Such locations are appropriate for placement of pin electrodes or other rigid charge removal members to remove electric charge from the rapidly flowing steam. Pins 17 mounted around bearing cone 80 represent a particular case of such an installation.

In the claims, "charge density" refers to a quantitative indication of the amount of electric charge present in the steam provided by a charge probe and related electronics. While a contact-type charge probe is described herein, non-contact probes and other charge measuring devices can also be used to monitor charge density. "Electrical ground" refers to the steel shell of the exhaust hood and condenser, and the various other components of the generating unit in good electrical contact with them, directly or indirectly, including the shell of the turbine and the guide blades. "Electrical ground" also refers to the electric potential of the above identified components of the generating unit. "Voltage" refers to the potential difference between the rigid charge removal members and electrical ground.

What is claimed is:

1. A power generating unit having
   an electrical ground,
   a steam flow zone,
   electrically charged steam flow in said steam flow zone, and
   at least one turbine exhaust orifice,
   wherein the improvement consists of providing means for removing electric charge from said electrically charged steam flow,
   said charge removal means comprising rigid charge removal members at least partially exposed to said electrically charged steam flow, and
   connected to said electrical ground directly.

2. The power generating unit of claim 1, wherein said rigid charge removal members are installed around said turbine exhaust orifice.

3. The power generating unit of claim 2, wherein said rigid charge removal members are metallic pins.

4. The power generating unit of claim 2, wherein said rigid charge removal members are made of stainless steel.

5. The power generating unit of claim 1, wherein said power generating unit has L-stage guide blades, and said rigid charge removal members are mounted on said L-stage guide blades.

6. The power generating unit of claim 5, wherein said rigid charge removal members are metallic pins.

7. The power generating unit of claim 1 further having metallic members
   internal to said steam flow zone and
   having trailing edges,
   where said rigid charge removal members are mounted upon said trailing edges.

8. The power generating unit of claim 7, wherein said rigid charge removal members are metallic pins.

9. The power generating unit of claim 7, wherein said rigid charge removal members are made of stainless steel.

10. The power generating unit of claim 1 further having
    steam flow paths and
    metallic members that are
       internal to said steam flow zone and
       define said steam flow paths,
    wherein said rigid charge removal members are mounted upon said internal metallic members and extend into said steam flow paths.

11. The power generating unit of claim 10, further having at least one bearing cone, where said rigid charge removal members are mounted on said bearing cone.

12. The power generating unit of claim 11, wherein said rigid charge removal members are metallic pins.

13. A power generating unit having
an electrical ground,
a steam flow zone,
electrically charged steam flow in said steam flow zone having an electric charge density, and
at least one turbine exhaust orifice,
wherein the improvement consists of providing means for removing electric charge from said electrically charged steam flow, said charge removal means comprising rigid charge removal members that
   are at least partially exposed to said electrically charged steam flow, and
   are isolated from direct electrical contact with said electrical ground, and
   are connected to said electrical ground through a power supply which applies a voltage to said rigid charge removal members.

14. The power generating unit of claim 13, wherein said rigid charge removal members are installed around of said turbine exhaust orifice and at least partially exposed to said steam flow.

15. The power generating unit of claim 14, wherein said rigid charge removal members are metallic pins.

16. The power generating unit of claim 14, wherein said rigid charge removal members are made of stainless steel.

17. The power generating unit of claim 13, further provided with means for monitoring said electric charge density.

18. The power generating unit of claim 17, further provided with means for automatically controlling said voltage to maintain said electric charge density within a predetermined range of values advantageous to the purpose of maximizing energy conversion efficiency of the power generating unit.

19. The power generating unit of claim 13 further having metallic members internal to said steam flow zone and
having trailing edges,
where said rigid charge removal members are mounted upon said trailing edges.

20. The power generating unit of claim 19, wherein said rigid charge removal members are metallic pins.

21. The power generating unit of claim 13, further having at least one bearing cone, where said rigid charge removal members are mounted on said bearing cone.

22. The power generating unit of claim 21, wherein said rigid charge removal members are metallic pins.

23. A power generating unit having
an electrical ground,
a steam flow zone having internal locations,
electrically charged steam flow in said steam flow zone having an electric charge density, said electric charge density
   being positive in at least one of said internal locations, and
   being negative in at least one of said internal locations,
wherein the improvement consists of providing a bipolar charge collector which is
   isolated from electrical ground, and
   is exposed to electrically charged steam flow in at least one internal location
   characterized by positive charge density, and
   is exposed to electrically charged steam flow in at least one internal location
   characterized by negative charge density,
whereby electric charge is removed from the electrically charged steam flow in both locations with no need for an external power supply.

* * * * *